Figure 6:
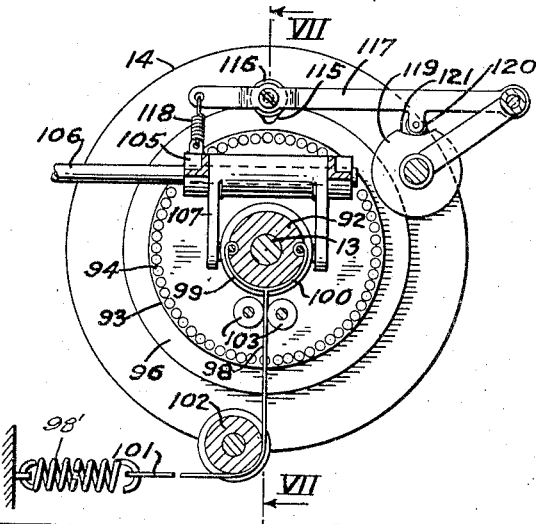

Dec. 20, 1938.   F. W. SCHWAB   2,141,048
INTEREST CALCULATING MACHINE
Filed Dec. 21, 1936   3 Sheets-Sheet 1
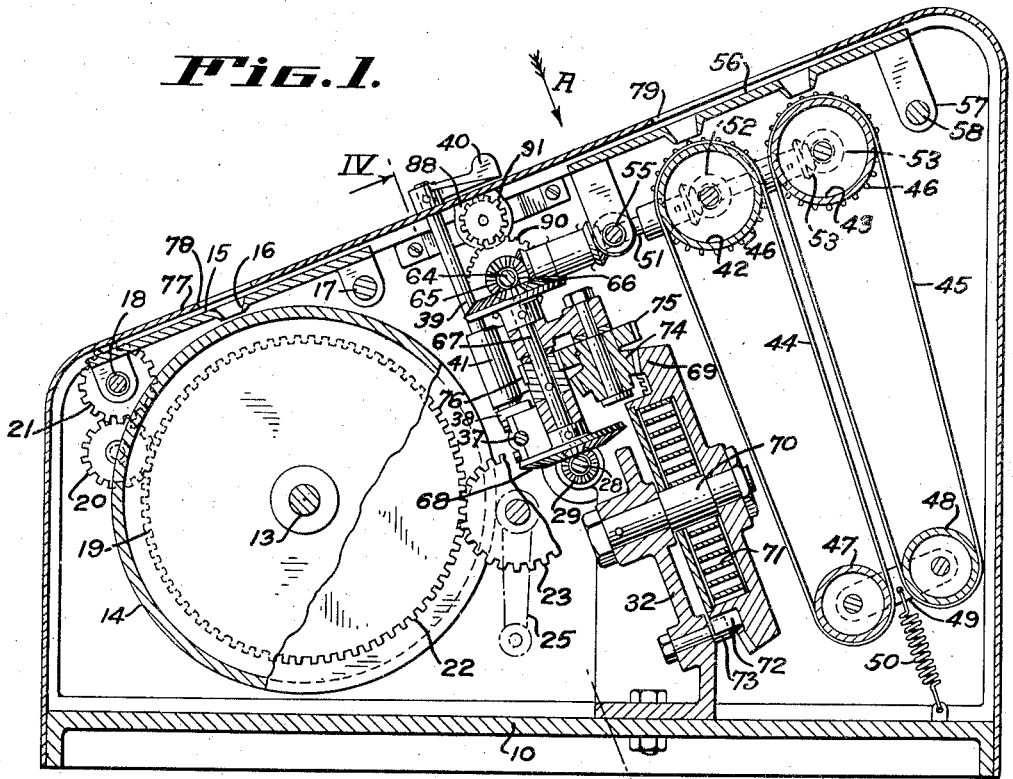
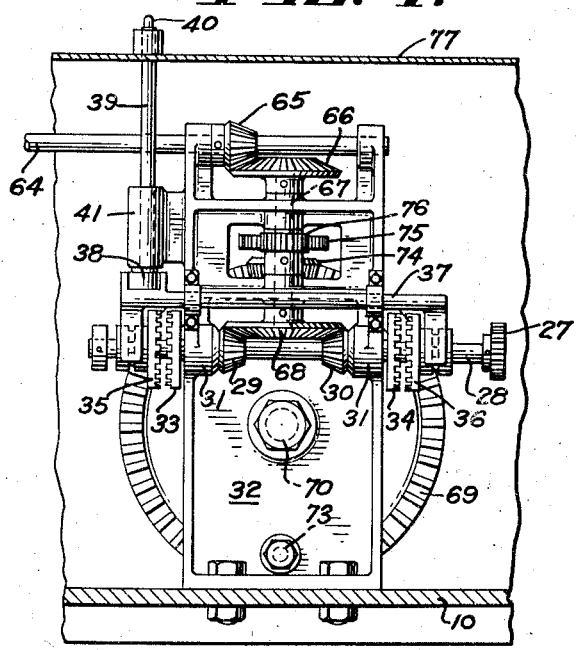
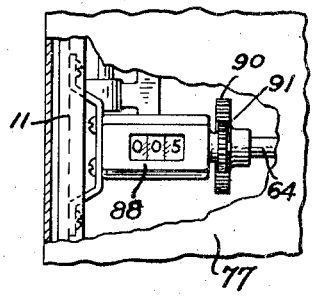
INVENTOR.
FREDERICK W. SCHWAB
BY
ATTORNEY Dec. 20, 1938.    F. W. SCHWAB    2,141,048
INTEREST CALCULATING MACHINE
Filed Dec. 21, 1936    3 Sheets-Sheet 2
*Fig. 2*
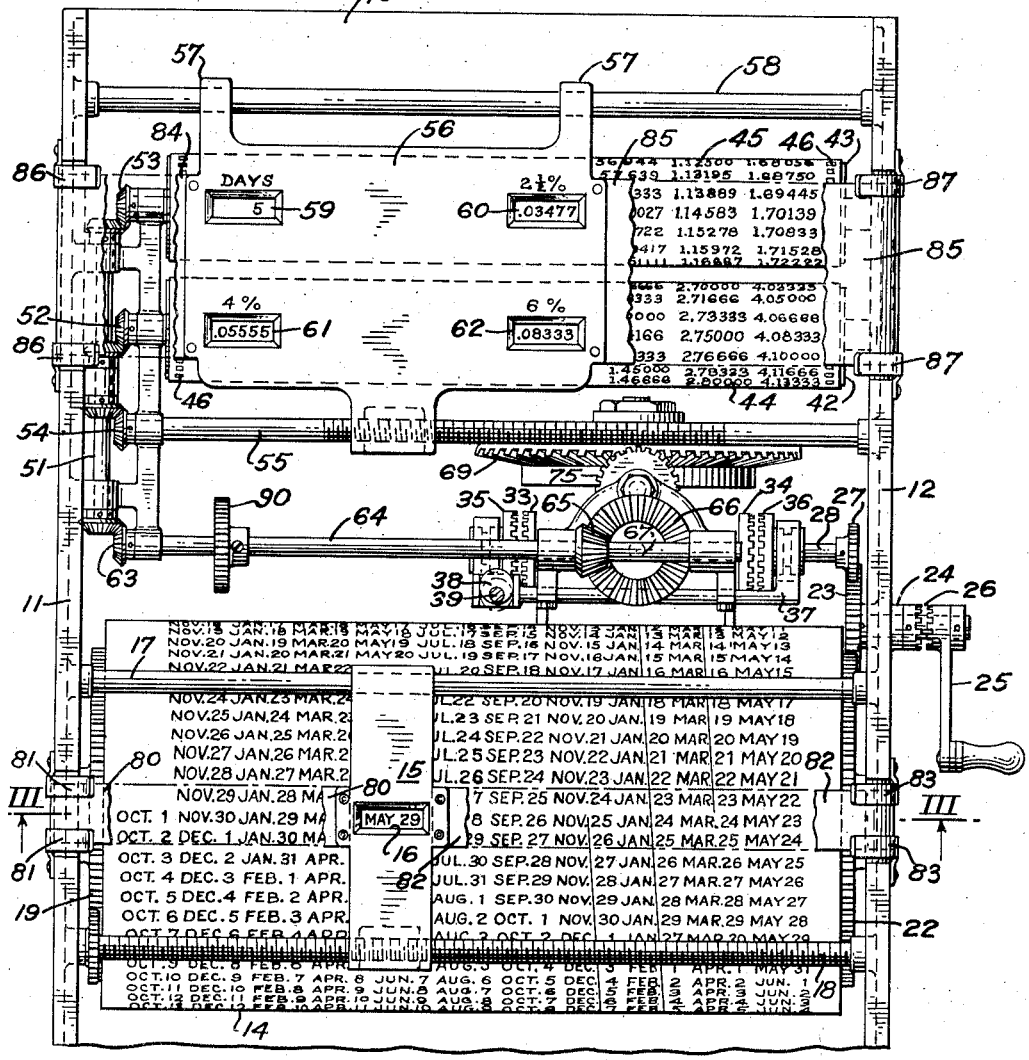
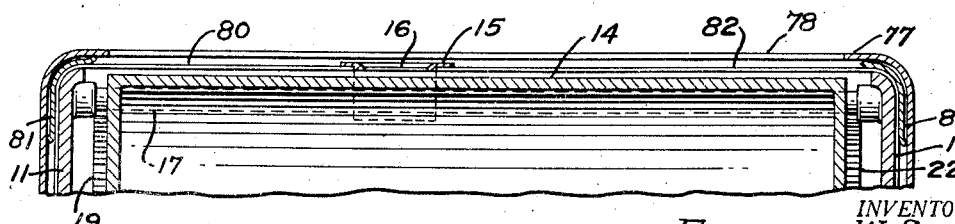
*Fig. 3*
INVENTOR.
FREDERICK W. SCHWAB
BY
ATTORNEY.

Dec. 20, 1938.  F. W. SCHWAB  2,141,048
INTEREST CALCULATING MACHINE
Filed Dec. 21, 1936  3 Sheets-Sheet 3

INVENTOR.
FREDERICK W. SCHWAB
BY
ATTORNEY.

Patented Dec. 20, 1938

2,141,048

UNITED STATES PATENT OFFICE 2,141,048

INTEREST CALCULATING MACHINE

Frederick W. Schwab, San Francisco, Calif.

Application December 21, 1936, Serial No. 116,849

7 Claims. (Cl. 235—67)

The present invention relates to calculating devices and more particularly to a device for determining the number of days between two definite dates and also interest factors which may be used to determine the exact interest for any number of days at different rates of interest.

An object of the invention is to provide an interest calculating device in which novel means is provided whereby the time and accrued interest between known dates may be quickly and accurately determined by a simple operation.

Another object of the invention is to provide an interest calculating device in which the number of days and the interest factor may be determined in a direct manner in either direction from a given date.

Another object of the invention is to provide an improved interest calculating device in which the number of lapsed days and the interest factor may be determined in a direct and accurate manner when the dates extend to or from a date in a leap year.

Another object of the invention is to provide in a calculating device of the character described a novel means for returning the day and interest determining mechanism to its starting position in an automatic manner.

Another object of the invention is to provide an arrangement wherein the number of lapsed days between two given dates may be accurately determined independently of the interest factor indicating elements of the device.

Another object of the invention is to provide in an interest calculating device a means whereby the machine may be returned in an automatic manner to any definite date as a starting point for subsequent calculations.

Other objects and advantages will appear in the following specification and the novel features of the invention will be particularly pointed out in the appended claims.

For a better understanding of the invention reference should be had to the accompanying drawings, wherein there is shown by way of illustration and not of limitation, preferred embodiments thereof.

Figure 7:
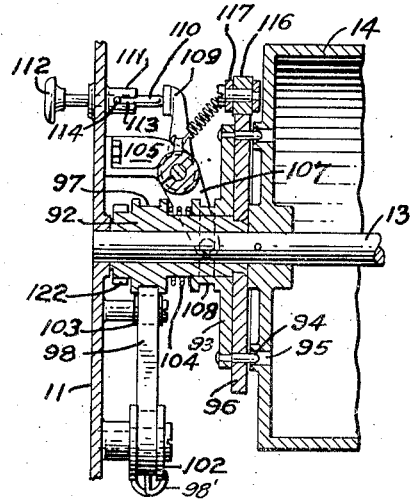
Figure 8:
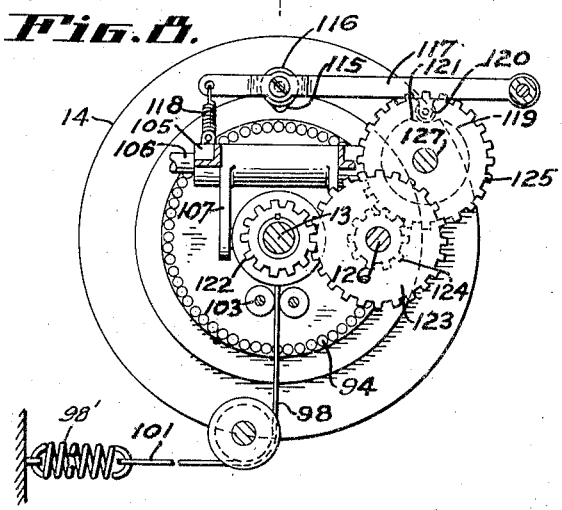
Figure 9:
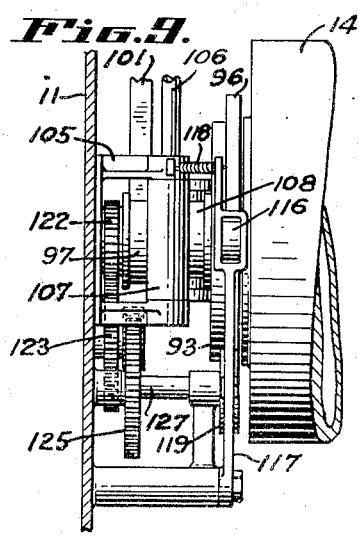
Figure 10:
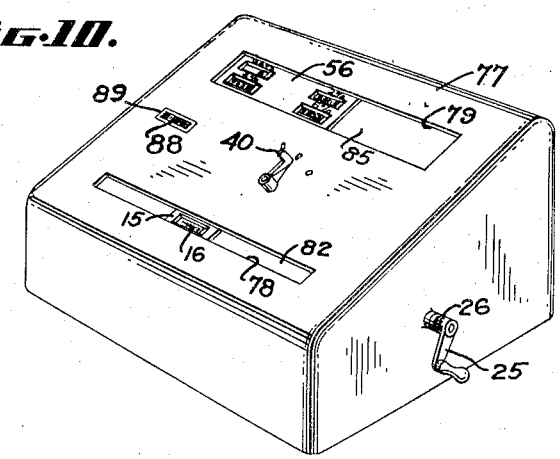

In the drawings, wherein like numerals refer to like parts throughout the several views;

Figure 1 is a side elevation in section with parts broken away to show the details of construction, Figure 2 is a plan view with the cover removed taken in the direction of arrow A in Figure 1, Figure 3 is a fragmentary sectional view taken along line III—III of Figure 2 looking in direction of arrows, Figure 4 is a fragmentary sectional view taken along line IV—IV of Figure 1, Figure 5 is a fragmentary view showing the details of an optional day counter and driving means therefor, Figure 6 is a fragmentary end elevation partially in section showing the details of a date drum returning mechanism, Figure 7 is a vertical sectional view taken along line VII—VII of Figure 6, Figure 8 is a view similar to Figure 6 taken along a different plane, Figure 9 is a fragmentary plan view of the arrangement illustrated in Figure 8, and Figure 10 is a perspective view of a completed machine with a suitable cover disposed thereover.

Reference will now be made to the drawings for a detailed description of the various elements which go to make up the device contemplated by this invention.

As shown, particularly in Figures 1 and 2 of the drawings, the elements of the device are mounted upon a base 10 having spaced vertically disposed side frames 11 and 12 between which the operating parts are mounted. At one end of the frame base 10 and rotatably mounted upon a shaft 13 there is a drum 14 that carries spirally arranged date indicia, and associated with the drum 14 there is a transversely movable cursor or slide 15 having an aperture 16 through which the date indicia upon the drum 14 is viewed when the device is in operation. The cursor 15 is slidably mounted upon a guide 17 and is adapted to be moved over the date drum 14 by a lead screw 18 as the drum 14 is turned. The lead screw 18, as shown in the drawings, is driven by a large gear 19 secured upon the end of the drum 14, through an idler gear 20 and a gear 21 upon the end of the lead screw. At the other end of the drum 14 and rotatable therewith is a second gear 22 that meshes with a crank operated gear 23. The gear 23 is shown in Figure 2 of the drawings as journaled in a bearing 24 carried by the side frame 12, and at the outer end of its shaft there is a crank 25 that may be operably connected to the gear 23 by means of a splined connection 26.

As shown in Figure 2 of the drawings, the gear 23 also meshes with a gear 27 secured upon a shaft 28 so that when the crank 25 is turned to rotate the gear 23 and the date drum 14, the shaft 28 will also be turned to provide a drive for other indicia bearing charts, as will hereinafter appear.

Upon referring to Figure 4 of the drawings it will be noted that the shaft 28 extends freely through the hubs of two beveled gears 29 and 30, which are journaled in bearings 31 carried by a supporting frame 32. The beveled gears 29 and 30 are also here shown as respectively carrying toothed clutch plates 33 and 34, by means of which they are adapted to be connected with the shaft 28 through axially movable cooperating clutch plates 35 and 36, keyed slidably upon the shaft 28. The clutch plates 35 and 36 are adapted to be simultaneously moved into and out of meshing engagement with their respective clutch plates 33 and 34 by means of a forked clutch operating member 37 that is movable laterally upon the supporting frame 32. A cam 38 upon the lower end of a shaft 39, which carries a lever 40, controls the operation of the clutch plates 35 and 36. The shaft 39 is journaled in a vertical bearing 41 carried by the supporting frame 32, and the lever 40 is secured at the upper end thereof outside of the cover which encloses the apparatus. The operation of the clutch plates 35 and 36 and the drive affected thereby will be described in more detail hereinafter.

At this point reference is again made to Figures 1 and 2 of the drawings for a description of the day counting and interest factor indicating features of the device. Mounted adjacent, and extending parallel with the date drum 14, there are shown two rollers 42 and 43 over which continuous web-like charts 44 and 45 carrying additional interest determining indicia are disposed. These web-like charts 44 and 45 are each provided with a perforated edging which cooperates with teeth 46 upon the rollers 42 and 43, so that the position of the charts will always maintain a definite relation to the rollers 42 and 43. The hanging portions of the charts 44 and 45 extend around tension rollers 47 and 48 which serve to retain the charts taut upon the rollers 42 and 43. The tension rollers 47 and 48 are shown as held in spaced relation by means of an equalizing rod 49 which is engaged at its center by means of a tension spring 50. The rollers 42 and 43 are adapted to be driven from a shaft 51 which is connected thereto by means of beveled gear connections 52 and 53 respectively. The shaft 51 also carries an additional beveled gear drive 54 that serves to turn a lead screw 55, which is adapted to control the lateral movement of a second cursor or apertured plate 56 disposed over the indicia upon the charts 44 and 45 carried by the rollers 42 and 43. The cursor 56, in addition to its threaded connection upon the lead screw 55, also has guide arms 57 which slidably engage a guide rod 58. As shown in Figure 2 of the drawings, the cursor 56 has four apertures, designated by the numerals 59, 60, 61 and 62, through which the indicia upon the charts 44 and 45 may be viewed. The shaft 51, which drives the rollers 42 and 43 and the lead screw 55, is adapted to be driven through a beveled gear connection 63 by a shaft 64. At its other end the shaft 64 carries a beveled gear 65 which meshes with a larger beveled gear 66 carried upon a vertical shaft 67. The beveled gear 66, as shown in Figures 1 and 4 of the drawings, is located at the upper end of the shaft 67, and at its lower end this shaft 67 carries a similar beveled gear 68 which is adapted to be driven by either the beveled gear 29 or the beveled gear 30, depending upon the position of the clutch plates 35 and 36, as determined by the clutch operating lever 40.

The nature and function of the indicia carried by the charts 44 and 45 requires, during an operation of the device, that these charts move from a zero or starting position simultaneously with a rotation of the drum 14 irrespective of in which direction the drum 14 is turned, and therefore, in accordance with the present invention, the shaft 64 which operates the charts 44 and 45 is adapted, through the medium of the aforesaid clutch plates 35 and 36, to be rotated always in one end the same direction when the operating crank 25 is turned by the operator in either direction.

In connection with the charts 44 and 45 there is also provided a means which will automatically bring these charts back to their zero or initial starting positions, so that when the clutch controlling lever 40 is placed in either of its operative positions, these charts will move from their initial or zero point in synchronism with the date carrying drum 14. This return mechanism, as shown in the drawings, comprises a relatively large gear 69 which is rotatably mounted upon a stub shaft 70 carried by the supporting bracket 32. The gear 69 is biased for a clockwise rotation, as viewed in Figure 4 of the drawings, by means of a spiral clock spring 71 which tends to return an abutment 72 upon this gear to a position against a stop 73 which is also located upon the supporting bracket 32. The large gear 69 drives a beveled gear 74 which is connected through a gear 75 and a gear 76 to the vertical shaft 67. With this arrangement it will be seen that when the shaft 67 is rotated in its proper direction by a forward or reverse turning of the crank 25, as determined by the position of the clutch plates 35 and 36, the clock spring 71 will be wound up as the charts are moved by an operation of the shaft 64 which is driven by the shaft 67. The peripheral dimension of the gear 69 is equal to the linear movement of the charts 44 and 45, and as a result it is possible to move these charts throughout their entire range before the gear 69 has made a complete revolution. When the charts 44 and 45 have been moved from their zero position, the spring 71 will be wound up so that when the clutch lever 40 is operated to return the clutch plates 35 and 36 to their neutral positions, as is required between subsequent calculations, the charts 44 and 45 will be immediately returned by means of the clock spring 71 to their initial or zero positions and ready for a subsequent calculation. This operation of the clutch controlling lever 40 will release the shaft 28 and permit a manual return of the date drum 14 to any required date from which a subsequent calculation of interest may be desired. As soon as the date drum 14 has been returned to the desired date, the clutch controlling lever 40 will then be moved either to the right or to the left, depending upon whether the interest calculation is to be made forward or backward from the chosen date to connect the charts 44 and 45 with the crank controlled shaft 28, and then the number of days and interest factor for any desired number of days can be determined by rotating the date drum 14 from the date chosen to the date which indicates the end of the period with respect to which the interest calculation is desired.

The internal mechanism described above will be enclosed by means of a suitable cover 77 having a slot 78 located above and extending substantially throughout the entire length of the date drum 14 and a slot 79 which is located above and extends substantially throughout the width of the charts 44 and 45. The cursor 15 moves between the cover 77 and the top surface of the drum 14, so that its aperture 16 will be visible through the slot 78 and the cursor 56 is disposed between the cover 77 and the charts 44 and 45, so that the apertures 59, 60, 61 and 62 will be visible through the slot 79. Since the cursors 15 and 56, because of their movement, are necessarily made of a width less than the length of the slots 78 and 79, it is desirable that some means be provided to close these slots at either side of the cursors so that the internal mechanism and other indicia upon the date drum and charts will not be visible except through the apertures referred to above. For this purpose the cursor 15 is shown as having a tongue-like member 80 of flexible steel extending from one side, which is directed down along the side of the frame member 11 by means of guides 81, and at its other side the cursor 15 has a similar tongue-like member 82, which is directed down along the outside of the frame 12 by guide members 83. The length of the tongue-like members 80 and 82 is such that when the cursor 15 is moved to either end of its travel, these tongue-like members will be drawn out so as to close the slot 78 in the cover 77.

In connection with the cursor 56 there is also provided similar tongue-like closure members 84 and 85 which are directed down along the side frames 11 and 12 respectively, by means of guides 86 and 87. Because of the greater width of the cursor 56 the tongue-like members 84 and 85 are considerably shorter than are the tongue-like members 80 and 82 associated with the cursor 15. The manner in which the tongue-like members 80 and 82 are disposed between the cover 77 and the date drum 14 is clearly illustrated in Figure 3 of the drawings. While the cover 77 is described above as having two slots, one designated by the numeral 78 which cooperates with the date indicia carrying drum 14, and one designated by the numeral 79 which cooperates with the two charts 44 and 45 that carry the date indicating and interest factor indicia, it will be understood that the latter slot may be formed as two separate slots, one for the chart 44 and one for the chart 45. At this point it may also be stated that while there is shown in the drawings only two interest indicia carrying charts, the device may be constructed so as to contain any additional number of charts, all of which will operate in substantially the same manner as the two described above. It is also conceivable that the device might be made with but a single chart. In this latter event the single chart may have both date and interest indicia thereupon or it may have interest indicia for different rates of interest. In this latter event, with only the interest factors upon the charts 44 and 45, a separate day counting device, designated by the numeral 88, will be provided, to indicate the number of lapsed days between any two desired dates. This day counting device 88 may be mounted in any suitable manner upon the side frame 11 of the device and will be so located that its indicating dials will be visible through an aperture 89 in the top cover 77. As shown, the device 88 is adapted to be driven from the shaft 64 by means of gears 90 and 91, and when driven it will be seen that the counter indicating dials will advance with and be returned to their zero position in the same manner as the day indicating indicia provided upon the chart 45. When the day counting device 88 is used, it will be possible to provide an additional series of interest factors upon the chart 45 in lieu of the day indicating indicia now shown thereupon.

Reference is now made to Figures 6, 7, 8 and 9 of the drawings, which show an additional improvement that is optional with the device illustrated in Figures 1 and 2 of the drawings. The arrangement here illustrated is to also provide for an automatic return of the date drum to any definite chosen date irrespective of in which direction the date drum 14 is turned from the chosen date. A further feature of this improvement resides in the fact that it may be rendered inoperative to permit a manual forward and reverse movement of the drum by means of the crank 25. This feature comprises a clutch carrying member 92 upon which there is slidably mounted a clutch plate 93 having a plurality of pins 94 that are adapted to engage a similar number of apertures 95 provided upon the date carrying drum 14. The number of these pins and apertures will correspond to the number of date lines upon the drum 14, so that when the pins 94 are in engagement with the drum 14 the clutch plate 93 will be secured in a definite position with respect thereto. Associated with the clutch plate 93 and non-rotatably fixed upon the member 92 there is a stop plate 96 through which the pins 94 project. The function of this stop plate 96 will be described hereinafter. The clutch plate carrying member 92 has a drum-like portion 97 about which a band 98 is adapted to be wrapped when the date drum 14 is engaged by the clutch pins 94 and rotated in either direction. This band 98, as shown in Figure 6 of the drawings, is bifurcated at its end so as to provide portions 99 and 100 which engage opposite sides of the drum portion 97 and carry the band 98 thereover when the clutch carrying member 92 is turned, as above indicated. The band 98 is adapted to be placed under tension by means of a spring 98' connected at its ends 101, so that when the handle 25 is released, as by disengaging the clutch 26, the member 92 will be turned under the influence of the tension exerted by the spring 98' through the band 98 to the position shown in the drawings. As a result when the clutch plate 93 is connected to the date drum 14 the latter will be returned to the particular date corresponding to the position determined by the connection provided through the clutch pins 94. The band 98 is shown in the drawings as passing around a pulley 102, and adjacent the drum portion 97 it passes between guide rollers 103.

As shown in Figure 7 of the drawings, the clutch pin carrying plate 93 is biased toward the date drum 14 by means of a spring 104, and disposed above and extending transverse to the clutch carrying member 92 there is a bearing bracket 105 which carries a shaft 106. Keyed upon the shaft 106 there is a forked member 107 which engages a groove 108 upon the clutch pin carrying member 93. Carried by the shaft 106 there is also a pressure receiving crank 109 against which a push rod 110 is adapted to operate. The push rod 110 is slidably mounted in a bearing 111, and at its outer end it carries a knob 112 upon which pressure may be exerted by the operator. The bearing 111 has a slot 113 extending into its inner end in which a pin 114 is adapted to move. With this arrangement it will be seen that when the push rod 110 is moved inwardly to release the clutch, it can be secured in this position by rotating the knob 112 so as to bring the pin 114 out of alignment with the slot 113. This will lock the clutch pin carrying plate 93 in its inoperative position and permit a free manual return of the date carrying drum 14.

Upon referring to Figures 6 and 8 of the drawings, it will be noted that the stop plate 96 has a notch 115 at one point thereupon, into which a stop roller 116 carried by a lever 117 is adapted to engage. The lever 117 is shown as biased into a downward position by means of a spring 118. The purpose of this stop roller 116 is to insure a definite positioning of the date drum 14 when it is returned to its starting point by means of the tensioned band 98. Since it is possible that the date drum may be rotated more than one revolution in taking a reading from one date to another, it is necessary that this stop roller 116 be rendered inoperative at all positions other than the starting position of the date drum. To accomplish this result the lever 117 is shown as rendered inoperative by means of a cam 119 which cooperates with a roller 120 upon the lever 117. The cam 119 has a single notch 121 which will permit the stop roller 116 to engage the notch 115 only when the parts are in the positions illustrated. To this end the cam 119 is shown as driven with approximately a four to one ratio drive by means of gears 122, 123, 124 and 125, the gear 122 being formed upon the clutch plate supporting member 92, and the gears 123 and 125 being respectively mounted upon shafts 126 and 127.

It is believed that the operation of the device and the several details thereof will be fully understood from the above description. However, the operation which has resulted in the set-up of the indicia shown in Figure 2 of the drawings will now be described. It is assumed that before starting the operation, the date drum 14 was in a position indicating the date May 24. From this point the operator has turned the crank 25 until the date May 29 appears in the opening 16 of the cursor 15. During this turning of the crank 25 the clutch plates 34 and 36 will be in engagement under the control of the lever 40, and as a result the shaft 64 will have been rotated a sufficient number of revolutions to move the charts 44 and 45 so as to bring an indication of the noted day number upon the chart 45 into view, and also the factors for computing the interest at the different rates designated over the remaining windows or apertures of the cursor 56, as shown. When the desired factor has been read through the cursor 56, the operator will move the lever 40 to its neutral position, and as a result the charts 44 and 45 will be automatically returned to their starting position by means of the clock spring 71, as previously described. The operator can then manually move the cursor 15 to any other date from which he wishes to make a subsequent calculation. If it should happen that the operator desires to determine the interest factor for some date removed from May 29, he will merely throw the lever 40 to the right or to the left, depending upon whether the date indicating the other limit of the time period is prior to or later than the date appearing through the cursor 15. If the date drum 14 is turned backward, the clutch operating lever 40 will be thrown to the left and the crank 25 will be turned forward, whereas if the drum 14 is rotated in a forward direction, the crank 25 will be turned in a backward direction and the clutch lever 40 will be thrown to the right. When the device is equipped with the improved features illustrated in Figures 6, 7, 8 and 9 of the drawings, a return of the date drum 14 will be automatically made upon a release of the crank 25 by disengagement of the clutch 26, as will be understood from the above description of this feature.

While I have, for the sake of clearness and in order to disclose the invention so that the same can be readily understood, described and illustrated specific devices and arrangements, I desire to have it understood that this invention is not limited to the specific means disclosed, but may be embodied in other ways that will suggest themselves to persons skilled in the art. It is believed that this invention is new and it is desired to claim it so that all such changes as come within the scope of the appended claims are to be considered as part of this invention.

Having thus described my invention, what I claim and desire to secure by Letters Patent is:

1. In a calculating device, the combination of a rotatable drum having date indicia chronologically arranged thereupon, a cursor associated with said drum through which a single date thereupon is visible, means for rotating said drum backward or forward from any date readable through said cursor to obtain an earlier or later date reading through said cursor, and means adjustable with respect to any date upon said drum having energy storing means for returning said drum backward or forward to the first date reading after the earlier or later date has been set up by an operation of the device.

2. In an interest calculating device, the combination of a rotatable drum having date indicia chronologically arranged thereupon, a cursor associated with said drum through which a single date upon the drum is visible, means for rotating said drum backward or forward from any date visible through said cursor to an earlier or later date indication upon said drum, an indicating means operating simultaneously with a rotation of said drum to indicate the number of days between any two date readings taken from said drum through its associated cursor, and means adjustable with respect to any initial date reading upon said drum having energy storing means for returning said drum to the initial date indicating position from which the drum is rotated.

3. In an interest calculating device, the combination of a rotatable drum having date indicia chronologically arranged thereupon, a cursor associated with said drum through which a single date thereupon is visible, means for rotating said drum backward or forward from any date visible through said cursor to an earlier or later date indication upon said drum, an energy storing spring for returning said drum to a starting position adapted to be wound when said drum rotating means is operated, means for adjustably connecting said energy storing spring to said drum with respect to the date indicating indicia thereupon, whereby said spring will become ineffective when it has operated to return said drum to the starting position from which it is rotated.

4. In an interest calculating device, the combination of a rotatable drum having date indicia chronologically arranged thereupon, a cursor associated with said drum through which a single date thereupon is visible, a releasable means for rotating said drum backward or forward from any date visible through said cursor to an earlier or later date indication upon said drum, an energy storing spring for returning said drum to a starting position independently of said means for rotating the drum adapted to be wound when said drum rotating means is operated, and means for connecting said energy storing spring to said drum with respect to the date indicating indicia thereupon, whereby said spring will operate to return said drum to its initial date indicating position upon a release of said drum rotating means.

5. In a calculating device, the combination of a rotatable drum having date indicia arranged thereupon, means movable transversely of said drum to indicate a selected initial date upon said drum, releasable means for rotating said drum backward and forward from said initial date to obtain an earlier or later reading indicated by said indicating means, means associated with said drum to indicate the number of days between said first and second indicated dates, energy storing means for returning said drum to the selected initial date when the means for rotating said drum is released from said drum and irrespective of the direction in which the drum has been turned, and means adjustably connected to said drum for connecting said energy storing means to said drum.

6. In a calculating device, the combination of a rotatable drum mounted upon a shaft and having date indicia arranged thereupon, means movable transversely of said drum to indicate a selected initial date upon said drum, releasable means for rotating said drum backward or forward from said initial date to obtain an earlier or later reading indicated by said indicating means, indicating means associated with said drum to indicate the number of days between said first and second indicated dates, energy storing means for returning said drum to the selected initial date when the means for rotating said drum is released from said drum and irrespective of the direction in which the drum has been turned, a clutch plate adapted to be adjustably connected to said drum, a flexible element acted on by said energy storing means and connected to said clutch plate, said flexible element being wrapped around a portion of said clutch plate when the drum is rotated in either direction, the energy storing means acting to return the drum to the selected initial date when the means for rotating the drum is released by unwrapping said flexible element from the portion of said clutch plate.

7. A calculating device as set forth in claim 6, comprising manually operated parts adapted to disengage the clutch plate from the drum and retain the clutch plate in disengaged position to permit a free return of the date carrying drum by operation of the drum rotating means.

FREDERICK W. SCHWAB.